United States Patent
Diggs et al.

(10) Patent No.: US 8,251,658 B1
(45) Date of Patent: Aug. 28, 2012

(54) TIP CAP FOR TURBINE ROTOR BLADE

(75) Inventors: William B Diggs, West Palm Beach, FL (US); Keith D Kimmel, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 513 days.

(21) Appl. No.: 12/633,314

(22) Filed: Dec. 8, 2009

(51) Int. Cl.
*F04D 29/38* (2006.01)

(52) U.S. Cl. ........... 416/62; 416/228; 416/226; 416/232

(58) Field of Classification Search .................. 416/228, 416/62, 146 R, 241 R, 189, 226, 232
See application file for complete search history.

(56) References Cited

U.S. PATENT DOCUMENTS

| | | | | |
|---|---|---|---|---|
| 4,519,745 A | * | 5/1985 | Rosman et al. | 416/96 A |
| 8,033,790 B2 | * | 10/2011 | Vance | 416/97 R |
| 8,162,617 B1 | * | 4/2012 | Davies et al. | 416/223 R |
| 2003/0059309 A1 | * | 3/2003 | Szucs et al. | 416/228 |

* cited by examiner

*Primary Examiner* — Edward Look
*Assistant Examiner* — William Grigos
(74) *Attorney, Agent, or Firm* — John Ryznic

(57) ABSTRACT

A turbine rotor blade with a spar and shell construction, and a tip cap that includes a row of teeth and slots extending from a bottom side that engage with similar shaped teeth and slots on a tip end of the spar to secure the tip cap to the spar against radial displacement. The tooth on the trailing edge end of the tip cap is aligned perpendicular to the pressure side wall of the blade in the trailing edge region in order to minimize stress due to the teeth wanting to bend under high centrifugal loads. To reduce stress, some of the teeth include a cutback to shorten the teeth in places where high stress levels would occur.

14 Claims, 2 Drawing Sheets

TIP CAP FOR TURBINE ROTOR BLADE

GOVERNMENT LICENSE RIGHTS

This invention was made with Government support under contract number DE-FG02-07ER84668 awarded by Department of Energy. The Government has certain rights in the invention.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine rotor blade with a spar and shell construction.

2. Description of the Related Art including information disclosed under 37 CFR 1.97 and 1.98.

A gas turbine engine, such as an industrial gas turbine (IGT) engine, compresses air that is then burned with a fuel to produce a high temperature gas flow, which is then passed through a turbine having multiple rows or stages or stator vanes and rotor blades to power and aircraft or, in the case of the IGT, drive an electric generator. It is well known in the art of gas turbine engine design that the efficiency of the engine can be increased by passing a higher gas flow temperature through the turbine. However, the turbine inlet temperature is limited by the material properties of the turbine, especially for the first stage airfoils since these are exposed to the highest temperature gas flow. As the gas flow passes through the various stages of the turbine, the temperature decreases as the energy is extracted by the rotor blades.

Another method of increasing the turbine inlet temperature is to provide more effective cooling of the airfoils. Complex internal and external cooling circuits or designs have been proposed using a combination of internal convection and impingement cooling along with external film cooling to transfer heat away from the metal and form a layer of protective air to limit thermal heat transfer to the metal airfoil surface. However, since the pressurized air used for the airfoil cooling is bled off from the compressor, this bleed off air decreases the efficiency of the engine because the work required to compress the air is not used for power production. It is therefore wasted energy as far as producing useful work in the turbine.

Recently, airfoil designers have proposed a new air cooled turbine rotor blade or stator vane design that is referred to as a spar and shell airfoil. U.S. Pat. No. 7,080,971 issued to Wilson et al. on Jul. 25, 2006 and entitled COOLED TURBINE SPAR SHELL BLADE CONSTRUCTION discloses one of these latest airfoils, the entire disclosure being incorporated herein by reference. The spar and shell construction allows for the use of a shell that can be made from an exotic high temperature alloy or material such as tungsten, molybdenum or columbium that could not be used in the prior art investment casting blades or vanes. Airfoils made from the investment casting technique are formed from nickel super-alloys and as a single piece with the internal cooling circuitry cast into the airfoil. Film cooling holes are then drilled after the airfoil has been cast. Without much improvement in the cooling circuitry of these investment cast nickel super-alloy airfoils, the operating temperature is about at its upper limit.

Thus, these new spar and shell airfoils will allow for the shell to be formed from the exotic high temperature materials because the shell can be formed using a wire EDM process to form a thin wall shell, and then the shell is supported by a spar to form the blade or vane. The exotic high temperature metals such as tungsten, molybdenum or columbium cannot be cast using the investment casting process because of their very high melting temperatures. However, thin walled shells made from these exotic high temperature metals can be formed using the wire EDM process. With a spar and shell airfoil having a shell made from one of these materials, the operating temperature can be increased way beyond the maximum temperature for an investment cast airfoil. Thus, the engine turbine inlet temperature can be increased and the engine efficiency increased.

One major problem with these new spar and shell rotor blades is securing the shell to the blade assembly without inducing too high of a stress level on the blade spar or tip section. Since the rotor blade rotates in the engine, high stress levels are formed on the blade parts that form the blade assembly. In some designs, the blade tip is formed as part of the spar to maintain low stress levels. In some designs, the blade tip is a separate piece from the spar and therefore must be attached to the spar while securing the shell to the blade assembly. Because the blade assembly must be supplied with cooling air to provide cooling for the shell, the spar must include at least one central passage for supplying the cooling air to the blade assembly. This hollow spar can result in less metal material in the tip region for the tip cap to be secured to the spar. High stress levels have been observed in computer modeling of various designs for the tip cap and spar connection.

BRIEF SUMMARY OF THE INVENTION

It is an object of the present invention to provide for a turbine rotor blade of the spar and shell construction with a tip cap as a separate piece from the main spar.

It is another object of the present invention to provide for a turbine rotor blade of the spar and shell construction with dovetail grooves and slots to secure the tip cap to the spar and hold the shell in place.

It is another object of the present invention to provide for a turbine rotor blade of the spar and shell construction with a tip cap having a dovetail slot and groove construction that results in a minimal stress level in the dovetail grooves.

It is another object of the present invention to provide for a turbine rotor blade of the spar and shell construction with a relatively low stress level in the blade tip cap to spar connection.

These objectives and more can be achieved by the turbine rotor blade with the spar and shell construction having dovetails and slots formed in the tip end of the spar and the bottom side of the tip cap so that the tip cap can be slid into place to secure the shell to the spar. The slots and dovetail grooves extend across the airfoil from the leading edge to the trailing edge and are parallel to each other in a single tip cap piece. The tip cap can be made of two pieces in which the slots in each would be parallel but the parallel slots in the first piece would not be parallel to the parallel slots in the second piece. The slot and groove closest to the trailing edge of the airfoil—which is the thinnest part of the airfoil—are perpendicular to the airfoil mean camber line in order to significantly reduce any bending of the tip cap trailing edge lugs due to centrifugal loads. The dovetails form slots and teeth to secure the tip cap to the tip end of the spar. To reduce stress levels to acceptable levels, some of the teeth have a cutback formed on one side such that the tooth does not extend to the edge of the tip cap. This cutback reduces the high stress concentration that would be present if the tooth extended all the way to the side edge of the tip cap. The cutbacks are formed mostly on the pressure side of the tip cap, but can also be formed on the suction side as well.

DETAILED DESCRIPTION OF THE INVENTION

The present invention is an air cooled turbine rotor blade that has a spar and shell construction. The shell is a thin walled shell to provide for relatively low metal temperature due to backside convection and impingement cooling, the shell being secured to the spar by a number of hooks extending from the shell that prevent bulging of the shell due to high cooling air pressure in channels formed between the spar and the shell, to produce a seal between adjacent cooling channels formed between the shell and the spar, and to allow for a relatively large metal surface in the tip region for attaching a separate tip cap to the spar while maintaining low stress levels at the tip section during rotor blade rotation.

Figure 1:
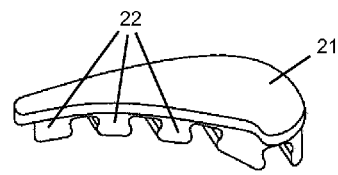
FIG. 1 shows an isometric view of a one piece tip cap of the present invention.

FIGS. 1 through 4 shows the turbine rotor blade of the first embodiment of the present invention with FIG. 1 showing a tip cap 21 with several rows of teeth 22 and slots extending from the bottom of the tip cap 21 and forming dovetail slots between the teeth 22. The tip cap 21 includes a leading edge (LE) lug and a trailing edge (TE) tooth both on the ends of the tip cap and other teeth in-between these end teeth that form a row of dovetail slots that are each parallel to one another.

Figure 2:
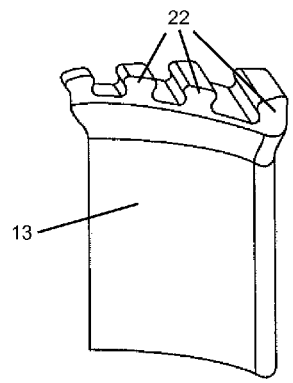
FIG. 2 shows an isometric view of a spar with dovetail slots and teeth on the tip end of the present invention.

FIG. 2 shows a tip end of the spar 23 and include teeth 22 that extend upward from the tip end and form dovetail slots in-between the teeth 22. The dovetail slots in the tip end of the spar 13 are also parallel to one another. The teeth and the dovetail slots in both the tip cap 21 and the spar 13 are sized and shaped so that the tip cap 21 can slide into place on the tip end of the spar 13 to secure the tip cap 21 against radial displacement with respect to the spar 13 and thus secure the shell 15 in place to form the rotor blade assembly.

Figure 4:
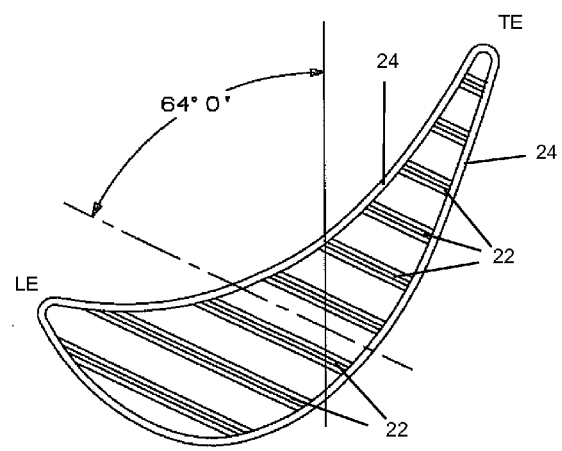
FIG. 4 shows a cross section view from the top of the tip cap with the angled teeth and slots of the present invention.
Figure 3:
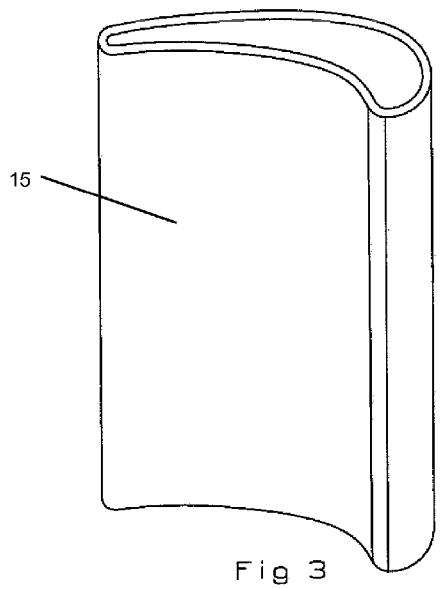
FIG. 3 shows an isometric view of a shell for the spar and shell blade of the present invention.

FIG. 3 shows the shell 15 that is secured between a platform and root section of the blade assembly (not shown) and the underside of the tip cap 21 when the tip cap 21 is secured to the tip end of the spar 13. FIG. 4 shows the teeth 22 that form the dovetail grooves in the tip cap 21 and the spar 13 are angled at 64 degrees with respect to a circumferential direction of the rotor blade assembly that is shown as a vertical line in FIG. 4. The angle is 64 degrees in this cross section airfoil because the tooth adjacent to the TE of the airfoil should be approximately normal to the airfoil surface on the pressure side wall. If the airfoil cross section would have more or less curvature, the angle might be different than 64 degrees. However, the TE tooth should be at an angle so that the TE tooth would be normal to the pressure side wall surface of the airfoil. The circumferential direction of the rotor blade assembly is the direction of rotation of the blade within the turbine of the engine.

The teeth 22 and grooves are offset at this angle (64 degrees) in order to more evenly distribute bending and minimize stress concentrations across the TE lug sectional area that occurs within the TE lug and groove when the rotor blade is rotating and the centrifugal loads act to pull the tip cap 21 away from the spar 13. The cross sectional shape of the airfoil will vary and so will the offset angle of the lugs from the mean camber line of the airfoil. The TE end of the tip cap is the thinnest portion of the tip cap, and thus the sectional area of the lug and groove is the smallest at the TE end. Because the lug at the TE end has the least cross-sectional area, this part of the tip cap is more sensitive to non-uniform bending than the other lugs and grooves in the remaining portions of the tip cap and spar due to the centrifugal loads. Therefore, to minimize the stress levels due to the tip cap lugs wanting to bend due to the centrifugal loads, the angle of the lugs and the grooves is offset from the circumferential direction by the 64 degrees in order to more evenly distribute load across the TE lug since it is most sensitive to bending, as seen in FIG. 4.

From computer modeling of the first embodiment of FIGS. 1 through 4 above, the applicant has discovered that the angle of the teeth or lugs 22 in the tip cap 21 of the embodiment shown in FIGS. 1 through 4 would produce a minimal amount of stress from bending of the lugs 22 if the TE most lug was perpendicular to the mean camber line of the airfoil in the trailing edge region. The tip cap 21 and spar 13 structure having the angle of the teeth and grooves offset from the circumferential direction by 64 degrees so that the lug 22 at the TE end is perpendicular to the mean camber line of the airfoil at the TE region as seen in FIG. 4. When the lug 22 and groove on the TE end are perpendicular to the mean camber line, the bending stress that results in the TE lug and groove as a result of the centrifugal loads is purely radial and thus evenly distributed along the TE sectional area, eliminating stress concentration due to non-uniform bending.

Figure 5:
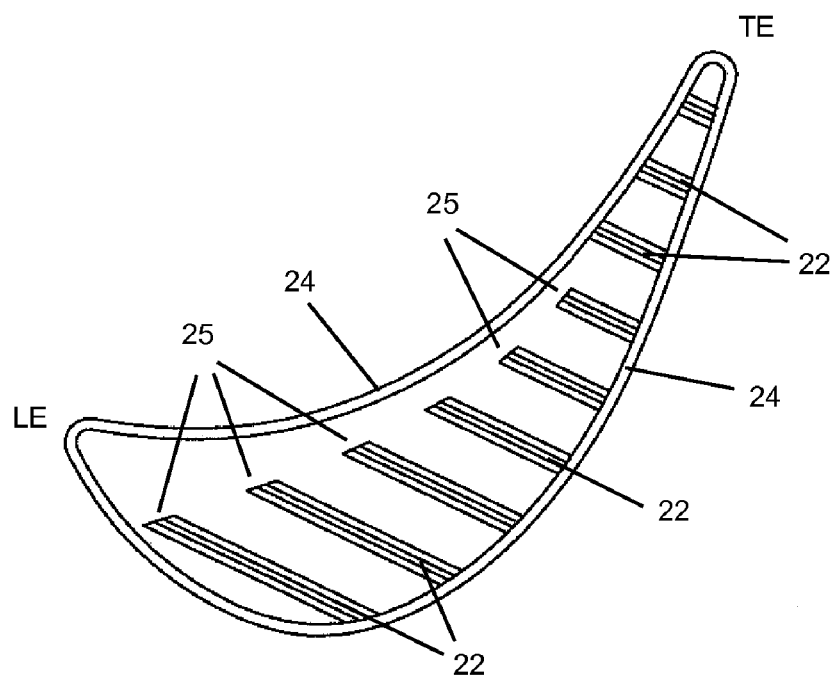
FIG. 5 shows a cross section top view of a tip cap with some of the teeth having angled cutbacks on the pressure side and suction side.

FIG. 5 shows the teeth and slots for the tip cap 21 in which some of the teeth 22 are formed with cutbacks 25 to reduce a stress concentration that would occur if the tooth extended all the way to the side edge of the tip cap 21. As seen in the FIG. 5 embodiment, the bearing surfaces of the three teeth on the TE side all extend from the P/S to the S/S of the tip cap and have no cutback formed on them. The tip cap 21 includes a lip 24 that extends around the outer periphery of the tip cap and forms an abutment surface for the tip end of the shell 15. The remaining teeth 22 all have cutbacks 25 in which the teeth do not extend all the way to the side of the tip cap. A tooth having a cutback 25 would not extend all the way to the lip 24. A tooth not having a cutback 25 would extend from the lip 24 on the P/S to the lip 24 on the S/S of the tip cap 21. The remaining teeth that extend to the LE have cutbacks 25 that are angled from one tooth to the adjacent tooth. A cutback 25 in the tooth is when the load bearing contact surface of the tooth does not extend all the way to the side of the tip cap where the shell 15 will be when positioned over the spar 13. A cutback 25 on a tooth is a tooth that does not extend all the way to the lip 24. The cutback 25 can be formed by machining away material or can be cast into the tooth during the process for casting the tip cap. If required due to high stress concentrations, the S/S of a tooth can also include a cutback to reduce the stress level.

The teeth 22 engage the slots formed on the tip end of the spar 13 to secure the tip cap 21 against radial displacement. The teeth and slots form bearing surfaces for the loads to act. The applicant's have discovered that high stress concentrations are formed on the ends of certain teeth on the tip cap 21. In order to reduce these high stress concentrations to acceptable levels, the teeth 22 having these high stress loads have a section of the tooth removed 25 where the bearing surface would be that would have the high stress concentration. The removed section is on one or both ends of the tooth. The shorter teeth would then pass all the loading to the remaining section of the teeth.

Figure 6:
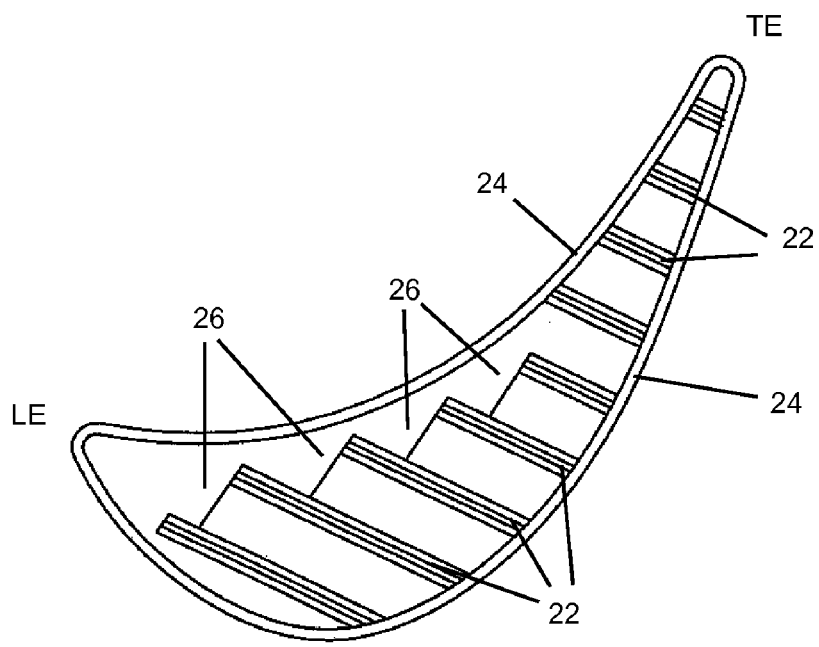
FIG. 6 shows a cross section top view of tip cap of another embodiment in which the cutbacks on the teeth are normal to the teeth.

In the FIG. 6 embodiment, the tip cap 21 includes teeth 22 with cutbacks 26 that are normal to the tooth longitudinal axis. The tip cap 21 includes a lip 24 that extends around the tip cap from the L/E to the T/E on both sides of the tip cap. Adjacent teeth have the material removed such that the tooth and the slot are cut at a normal direction instead of angled (follow the general direction of the lip 24) as in the FIG. 5 embodiment. The cutbacks 26 in the FIG. 6 embodiment serve the same purpose of stress concentration reduction as the FIG. 5 embodiment. The cutbacks 26 can be on the P/S and the S/S if the stress levels on the end of the tooth are high enough.

Thus, by not extending one or more of the teeth all the way to the lip 24 of the tip cap 21, the high stress concentration that would occur on the bearing surface of the tooth can be removed from the tip cap 21. A tip cap 21 with the cutbacks 25 or 26 will also be lighter in weight and therefore decrease the stress level on the teeth and slots even more.

In all of the embodiments of the present invention discussed above, the tip caps and the spars can be cast or machined to form the finished part. Or, the part can be cast and then the lugs or grooves can be machined to form the finished part. The shell is to be made from an exotic high temperature resistant metal such as tungsten or molybdenum or columbium (Niobium) using a wire EDM process to produce a thin wall shell. However, the tip cap and the spar can be made from conventional nickel super alloys for ease of casting or machining.

We claim the following:

1. A tip cap for a turbine rotor blade comprising:
the tip cap having an airfoil shape with a leading edge and a trailing edge, and a pressure side wall and a suction side wall extending between the leading edge and the trailing edge;
a lip extending around an underside of the tip cap and forming an abutment surface for a shell;
a plurality of teeth extending from the underside of the tip cap and forming slots between adjacent teeth; and,
one of the plurality of teeth having a cutback formed on one end of the tooth.

2. The tip cap of claim 1, and further comprising:
the plurality of teeth extend in a direction from the pressure side to the suction side of the tip cap.

3. The tip cap of claim 1, and further comprising:
the tooth adjacent to the trailing edge of the tip cap extends in a direction from the pressure side to the suction side of the tip cap at an angle perpendicular to the pressure side surface of the tip cap.

4. The tip cap of claim 1, and further comprising:
the teeth adjacent to the trailing edge of the tip cap have not cutbacks; and,
a plurality of the teeth in the remaining section of the tip cap have cutbacks on the pressure side of the tip cap.

5. The tip cap of claim 1, and further comprising:
one of the plurality of teeth includes a cutback on the suction side end of the tooth.

6. The tip cap of claim 1, and further comprising:
the teeth in the trailing edge region of the tip cap have no cutback; and,
the teeth in the leading edge region of the tip cap have cutbacks on the pressure side end of the tooth.

7. The tip cap of claim 1, and further comprising:
adjacent teeth form parallel slots.

8. The tip cap of claim 1, and further comprising:
the cutback has a length of around 2 mm from the lip.

9. A turbine rotor blade comprising:
a spar with a tip end having a plurality of teeth and slots;
a shell having an airfoil cross sectional shape with a leading edge and a trailing edge and a pressure side wall and a suction side wall;
a tip cap having an underside with a plurality of teeth and slots that engage the teeth and slots of the spar to secure the tip cap to the spar against a radial displacement; and,
at least one of the teeth on the tip cap has a cutback formed on one end of the tooth.

10. The turbine rotor blade of claim 9, and further comprising:
the tooth and slot on the tip cap adjacent to the trailing edge of the tip cap extends from a lip from the pressure side to the suction side.

11. The turbine rotor blade of claim 10, and further comprising:
the teeth and slots on the tip cap in the leading edge region each include a cutback on one end of the tooth.

12. The turbine rotor blade of claim 9, and further comprising:
the tip cap includes a lip on the underside that extends around the tip cap and forms an abutment surface for a tip end of the shell; and,
the cutback has a length of around 2 mm from the lip.

13. The turbine rotor blade of claim 9, and further comprising:
the teeth and slots on the tip cap in the trailing edge region have no cutback; and,
the remaining teeth and slots on the tip cap each have a cutback formed on one end of the tooth.

14. The turbine rotor blade of claim 13, and further comprising:
the cutbacks are formed on the pressure side end of the tooth.

* * * * *